(12) United States Patent
Drescher

(10) Patent No.: US 6,366,315 B1
(45) Date of Patent: Apr. 2, 2002

(54) ARRANGEMENT FOR LENGTHENING SENSOR LINES IN AN OPTOELECTRONIC CAMERA

(75) Inventor: Armin Drescher, München (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 0 days.

(21) Appl. No.: 08/260,318

(22) Filed: Jun. 15, 1994

(30) Foreign Application Priority Data

Jun. 15, 1993 (DE) .......................... 43 19 731

(51) Int. Cl.⁷ .................... H04N 5/225; H04N 1/04
(52) U.S. Cl. ............................ 348/207; 358/483
(58) Field of Search ..................... 348/207; 358/482, 358/483, 474, 513; 382/67; 359/636, 618; H04N 5/225

(56) References Cited

U.S. PATENT DOCUMENTS

| | | | |
|---|---|---|---|
| 3,571,489 A | * 3/1971 | Coale | 174/268 |
| 4,009,388 A | 2/1977 | Seachman | 250/208 |
| 4,707,615 A | * 11/1987 | Hosaka | 358/513 |
| 5,155,623 A | * 10/1992 | Miller et al. | 359/495 |
| 5,220,626 A | * 6/1993 | Suganuma et al. | 358/483 |

FOREIGN PATENT DOCUMENTS

| | | | |
|---|---|---|---|
| DE | 3616400 | 11/1986 | H04N/3/15 |
| DE | 3819828 | 12/1989 | H04N/3/10 |

* cited by examiner

*Primary Examiner*—Andrew B. Christensen
(74) *Attorney, Agent, or Firm*—Browdy and Neimark P.L.L.C.

(57) ABSTRACT

To lengthen sensor lines in an optoelectronic camera with the aid of a number of CCD line scanners, alternatingly transparent regions ($ST_1$, $ST_3$, ...) and reflective regions ($ST_2$, $ST_4$, ...) are formed in a beam splitter (ST) following the camera lens system, and between each of those regions, continuously varying transmission zones ($\text{ÜB}_1$, $\text{ÜB}_2$, $\text{ÜB}_3$, $\text{ÜB}_4$, ...) are provided. From the CCD line scanners ($CCD_1$–$CCD_5$), two long line modules ($M_1$, $M_2$) are formed, in which free interstices (FR) between the CCD line scanners are shorter than the length of a light-sensitive region of one CCD line scanner. The long line modules ($M_1$, $M_2$) are disposed such that the centers of the CCD line scanners the ($CCD_2$, $CCD_4$) of one long line module ($M_2$) coincide with the centers of the free interstices (FR) of the other long line module ($M_1$).

2 Claims, 1 Drawing Sheet

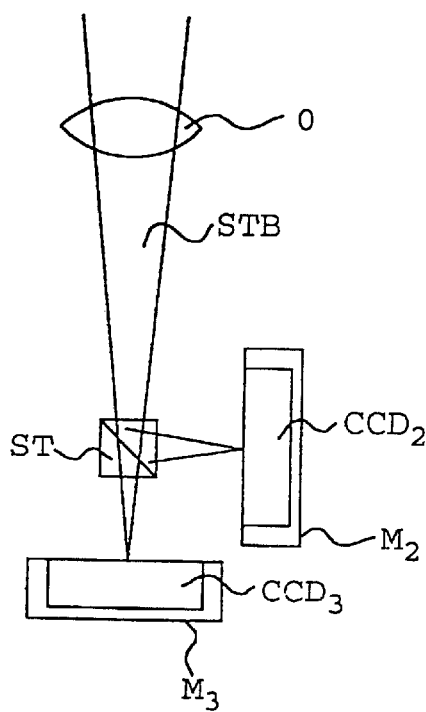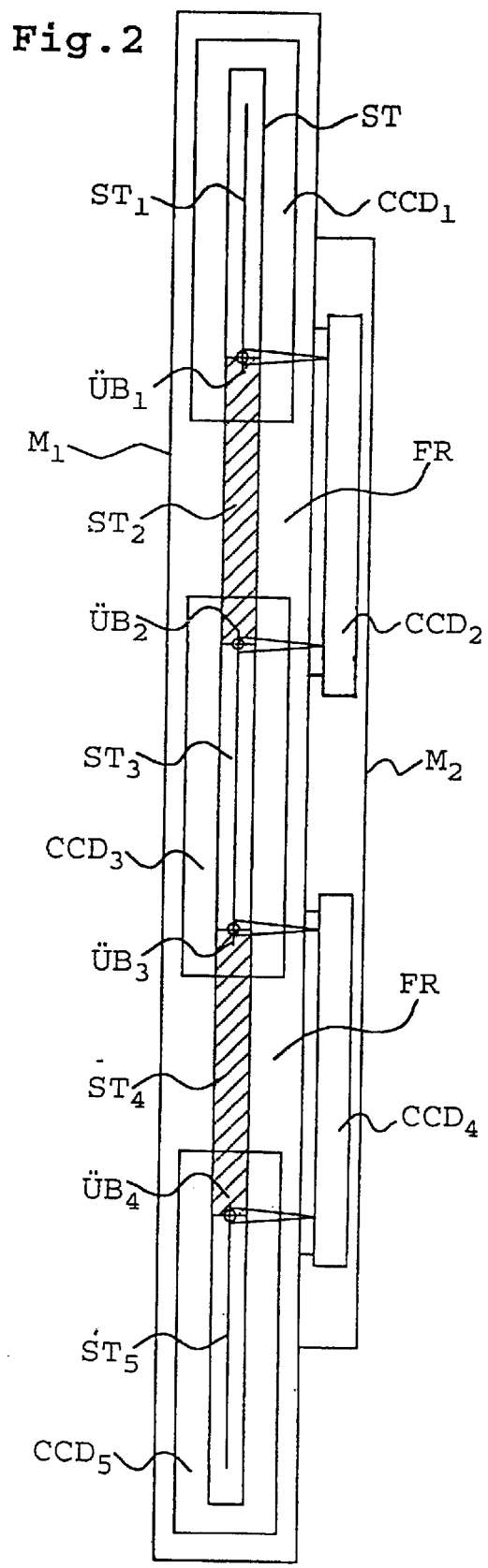

ARRANGEMENT FOR LENGTHENING SENSOR LINES IN AN OPTOELECTRONIC CAMERA

The invention relates to an arrangement for lengthening sensor lines in an optoelectronic camera with the aid of a number of CCD line scanners. (linear CCD arrays)

CCD line scanners (charge-coupled devices) that are now on the market have up to 5000 pixels. Remote sensing of the earth, however, requires up to several tens of thousands of pixels in one line. For a number of technical reasons, CCD line scanners are not manufactured in such a way that they can be placed one after the other without gaps between them.

To split up light behind a projection lens or lens system of an optoelectronic, camera, German Patent Disclosure DE 36 18 400 A1, in its technically simplest version, reflects approximately half of the light available behind the lens system of the optoelectronic camera to the side, by means of a semitransparent or half-mirror-coated optical beam splitter in the form of a mirror or prism. A first long line module formed of a number of CCD line scanners is located behind the beam splitter—in terms of the direction of the optical axis—in the primary image plane of the projection lens system. A second long line module, also made of CCD line scanners, is disposed laterally of the beam splitter above the primary image plane of the projection lens system, upon a rotation of 90°, for instance, about the longitudinal axis of the module.

Besides the above-described technically relatively simple version, DE 36 16 400 A1 also describes a number of other beam splitter configurations, but all of them yield hard, discontinuous transitions between fully reflecting and fully transparent zones of the beam splitter and are disposed above the primary image plane.

In the first described version for splitting light, each long line module receives less than about 50% of the available radiation. The other beam splitter configurations described there also imply imaging gaps and the disrupting effects of diffraction.

In German Patent Disclosure DE 38 19 828 A1, in order to split light behind the projection lens system of an optoelectronic camera, an optical beam splitter has a number of mirrors, reflecting to the right and left in alternation, or fully mirror-coated prisms. The length of these mirrors or prisms must be chosen so as to correspond exactly to the length of a single detector line of a commercial CCD line scanner.

In order to avoid gaps and the disruptive effects of diffraction in the image makeup, the beam splitter, or the axis connecting its individual mirrors or prisms, must be disposed precisely in the primary image plane of the optoelectronic camera. In this known version as well, two long line modules are provided; either they are disposed on both sides of the beam splitter, or as in one of the embodiments in the above-described patent DE 36 16 400 A1, one long line module is disposed in the direction of the optical axis of the camera, below the beam splitter, while the other is disposed laterally of the beam splitter, offset in height, after a rotation of 90° about the longitudinal axis of the module.

Since in this known embodiment the lengthened line is located precisely in the beam splitter, specifically in the primary image plane, the lengthened line or the beam splitter must be projected onto each of the two long line modules, via two sets of secondary lens systems. The number of secondary lens systems in each set must match the number of individual detector lines, in the form of the CCD line scanners, in the associated long line module.

As a result, each long line module receives all the light available behind the primary projection lens system; this light is somewhat attenuated only by the transmission of the secondary lens systems. Despite the segmented beam splitter disposed in the primary image plane of the projection lens system of the camera used, the large number of secondary lens systems required, and adjusting them, are the main obstacles to effective practical use; this arrangement is therefore actually used only to an extremely limited extent, if at all.

U.S. Pat. No. 4,009,388 discloses an arrangement in which the light behind a projection lens system of the camera used is split, by a half-mirror-coated optical beam splitter, to two parallel CCD line scanners that overlap one another completely.

The two CCD line scanners are offset from one another longitudinally only by one-half of one detector element, so that the centers of the individual detector elements of one CCD line scanner come to rest precisely in the boundary regions between the detector elements of the other CCD line scanners.

The method known from U.S. Pat. No. 4,009,388 therefore does not lengthen one complete line; instead, the line is merely equipped with twice as many detector elements, thereby refining the scanning but not lengthening the lines. Moreover, this method cannot be adopted to a long line module that involves gaps.

The object of the invention is therefore to create an arrangement for lengthening sensor lines in an optoelectronic camera in which a fundamentally arbitrary number of pixels can be lined up with one another in a sensor line in such a way that all the light intensity is available on a long line made of two modules.

According to the invention, in an arrangement for lengthening sensor lines in an optoelectronic camera as generically defined by the preamble to claim 1, this is attained by the characteristics in the body of that claim.

According to the invention, unlike DE 38 19 828 A1, the beam splitter used is not mirror-coated to the extent of 50% but rather is formed of alternatingly virtually completely transparent and completely mirror-coated segments, so that the various detector lines of the CCD line scanners, or their central regions, each receive the entire light intensity.

To avoid the effects of diffraction at the transition from the mirror-coated to the transparent regions of the optical beam splitter, this transition, according to the invention, is made gradually. A small portion of the usual length of a commercial CCD line scanner suffices for this purpose.

According to the invention, interstices between successively disposed CCD line scanners in each of the two long line modules are shortened, so that the end regions of the individual detector lines of the two long line modules overlap or coincide. The length of each overlapping or coinciding region of the CCD line scanners is chosen to be somewhat greater than the sum of the length of a transition region between a mirror-coated and transparent region of the beam splitter and the diameter of the optical beam path for a pixel in the beam splitter.

Also according to the invention, the signal from the coinciding regions of the two long line modules are added together electronically. Because of the provisions according to the invention, it is assured that all the pixels, or in other words each individual detector of the overall lengthened total line, has the entire radiant intensity available to it. The advantage over DE 36 16 400 A1 that is attained with the invention is therefore that, as a result of the aforementioned adding together of the signals, virtually all the light intensity of the available radiation behind or after the projection lens system is offered to the optoelectronic detectors in the coinciding region.

Compared with DE 38 19 828 A1, the advantages attainable with the invention are above all that secondary lens systems are avoided in the embodiment of the invention, thus averting the attendant difficulties in adjustment and transmission losses as well. Moreover, the radiometrically adulterating effects of diffraction at the radiometrically hard transitions of the reflected mirror surfaces are averted.

Furthermore, far less stringent demands are made for precision of the optical beam splitter than in the version of DE 38 19 828 A1, where the lengths of the individual mirrors or prisms of the beam splitter must match accurately to a fraction of one detector element, or in other words on the order of magnitude of approximately 1 μm.

The arrangement according to the invention for lengthening sensor lines in an optoelectronic camera thus represents a simplification over the arrangements used previously for that purpose, and a substantial increase in quality can moreover be attained.

The invention is described in detail below in terms of a preferred embodiment, in conjunction with the drawings. Shown are:

FIG. 1, a schematic simplified sectional view, approximately in the middle region of a plan view on an embodiment of an arrangement for lengthening sensor lines according to the invention, and FIG. 2, in a schematic and likewise highly simplified illustration, a plan view on the embodiment of an arrangement for lengthening sensor line according to the invention.

To explain the fundamental mode of operation of the invention, five linear CCD units, as can be seen from the schematic simplified plan view of FIG. 2, in the form of CCD line scanners $CCD_1$–$CCD_5$ are shown, each with a length of somewhat more than 5 cm. In each case, the length of the light-sensitive zone is 5 cm, which in practice is equivalent to 5000 sensors; the individual elements are spaced apart from one another by 10 μm. The width of each of the commercial CCD line scanners $CCD_1$–$CCD_5$ is approximately 15 mm. A lens or lens system O, merely suggested here by a schematically drawn lens, of an optoelectronic camera has an opening ratio of 1:4, by way of example. A beam STB suggested in FIG. 1 is focused by the lens system O.

An elongated beam splitter ST, when as shown in FIG. 2 a total of five CCD line scanners $CCD_1$–$CCD_5$ are used, has three transparent regions $ST_1$, $ST_3$ and $ST_5$, on each of its two ends, and mirror-coated regions $ST_2$ and $ST_4$ between them.

As can be seen from the schematic front view of FIG. 1, the beam splitter ST is spaced apart by a distance on the order of magnitude of 1 cm from the CCD line scanners $CCD_1$, $CCD_3$ and $CCD_5$, which are arranged in a plane located vertically below the beam splitter ST in FIG. 1 and which in their entirety form a first long line module $M_1$. At the same time, the beam splitter ST is disposed at the same spacing, 1 cm, for instance, from the CCD line scanners $CCD_2$ and $CCD_4$, which form a second long line module $M_2$, which is rotated by 90°, for instance, from the first long line module $M_1$ and is laterally offset in height, and as seen from FIG. 1, if the mirror-coated regions of the beam splitter extend at an angle of 45° from the optical axis, not is shown in FIG. 1, of the lens system O.

In the plan view of FIG. 2 it can be seen that the beam splitter ST has a total of five regions $ST_1$–$ST_5$, of which the three regions $ST_1$, $ST_3$ and $ST_5$ are transparent, and thus enable virtually complete transmission of the radiation, while the regions $ST_2$ and $ST_4$ located between them, shown shaded in FIG. 2, are mirror-coated regions with virtually complete reflection.

It can also be seen from FIG. 1 that the three transparent regions $ST_1$, $ST_3$ and $ST_5$ of the beam splitter ST—as viewed in the direction of the optical axis (not shown) of the lens system O of the camera, are disposed precisely above the CCD line scanners $CCD_1$, $CCD_3$ and $CCD_5$, which by way of example are located in the plane of the drawing of FIG. 2. The reflecting regions $ST_2$ and $ST_4$, shown shaded in FIG. 2, of the beam splitter ST, contrarily, are disposed offset in height precisely facing the CCD line scanners $CCD_2$ and $CCD_4$ that are rotated by 90°.

It can also be seen from the plan view in FIG. 2 that free interstices FR, are present between the CCD line scanners $CCD_1$, $CCD_3$ and $CCD_5$, which by way of example are located in the plane of the drawing in FIG. 2.

From the arrangement shown in FIGS. 1 and 2 of the total by way of example of five CCD line scanners $CCD_1$–$CCD_5$, a beam STB striking the beam splitter ST via the schematically shown lens system O of an optoelectronic camera (which otherwise is not shown in detail), is passed through the total of three transparent regions $ST_1$, $ST_3$ and $ST_5$ of the beam splitter ST and thus strikes the CCD line scanners $CCD_1$, $CCD_3$ and $CCD_5$ (disposed below it in FIG. 1), which together form the long line module $M_1$. The part of the beam STB that strikes the mirror-coated regions $ST_2$ and $ST_4$ of the beam splitter ST is deflected by its mirror-coated regions $ST_2$ and $ST_4$, disposed for instance at an angle of 45° in FIG. 1, by 90° (toward the right in FIG. 1) and thus strikes the CCD units $CCD_2$ and $CCD_4$, which are offset in height from the beam splitter and in FIG. 2 form the long line module $M_2$.

Because of the opening ratio of 1:4 assumed at the outset for the lens system O (schematically shown in FIG. 1), and at the likewise assumed selected spacing of approximately 1 cm between the beam splitter ST and the individual CCD line scanners $CCD_{1-CCD5}$, the diameter of an optical beam STB, which as can be seen from the schematic sectional view of FIG. 1 is conical in form, in the beam splitter becomes (1 cm×¼)=2.5 mm. In the example chosen, this is then the measure for a minimum coincidence between the lower end, in terms of FIG. 2, of the CCD line scanner $CCD_1$ and the opposite end of the CCD line scanner $CCD_2$; the upper end, in terms of Fig 2, of the middle CCD line scanner $CCD_3$ and the opposite end of the CCD line scanner $CCD_2$; the lower end, in terms of FIG. 2, of the middle CCD line scanner $CCD_3$ and the opposite end of the CCD line scanner $CCD_4$; and so forth, and this is true even if there is a sharply defined 30 transition between the transparent regions $ST_1$, $ST_3$ and $ST_5$ and the reflecting mirror-coated regions $ST_2$ and $ST_4$ of the beam splitter ST.

In FIG. 2, transition zones $ÜB_{1-ÜB4}$, each have a length, calculated above as an estimate, of 2.5 mm, which is equivalent to 250 elements or one twentieth (¹⁄₂₀) of the active zone 5 cm in length of a CCD line scanner. In the exemplary embodiment selected, with the aid of the total of 5 CCD line scanners $CCD_1$–$CCD_5$, which then partially overlap at the ends, the result is a scanning line with a total of 24,000 elements.

The length of the free interstices FR in each of the two long line modules $M_1$ and $M_2$ is selected to be correspondingly short, so that for the optoelectronic camera represented in FIG. 1 by its schematically shown lens system O, a radiometrically largely loss-free signal is assured, on the one hand by virtually loss-free signals from the central regions of the CCD line scanners $CCD_1$, $CCD_3$ and $CCD_5$ behind the virtually fully transparent regions $ST_1$, $ST_3$ and $ST_5$ of the beam splitter ST, or as a result of the virtually loss-free signals from the central regions of the CCD line scanners $CCD_2$ and $CCD_4$ behind the virtually fully reflecting regions $ST_2$ and $ST_4$ of the bean splitter, and on the other hand, by an electronic adding together of signals of the adjacent CCD line scanners $CCD_1$ and $CCD_2$, $CCD_2$ and $CCD_3$, $CCD_3$ and $CCD_4$, etc., in the coinciding regions, corresponding to the transition zones $ÜB_1-ÜB_4$, between the long line modules $M_1$ and $M_2$.

Because the intensities of the associated pairs of CCD line scanners $CCD_1-CCD_5$ in the total of four coinciding regions $ÜB_1$ and $ÜB_4$ are thus added together, there are no interruptions in image brightness. Hence diffraction phenomena at the edges of the transitions between the reflective and transparent regions, $ST_1$, $ST_3$ and $ST_5$ on the one hand and $ST_2$ and $ST_5$ on the other, are suppressed by means of continuous transition zones corresponding to the coinciding regions.

What is claimed is:

1. A loss-free arrangement for lengthening scan lines and avoiding secondary optical and diffraction effects in a single optoelectronic camera with the aid of a special beam splitter and a number of linear CCD detector arrays, wherein a single optics lens system (O) of the optoelectronic camera is followed by an optical beam splitter (ST), including alternatingly transparent segments ($ST_1$, $ST_3$, ... ) with substantially complete transmission and reflective segments ($ST_2$, $ST_4$, ... ) with substantially complete reflection transparent segments and the reflective segments being interleaved via intermediate transition zones providing a gradual chance from full reflection to full transmission;

from the number of linear CCD detector arrays ($CCD_1$, $CCD_2$, $CCD_3$, $CCD_4$, ... ), two long line modules ($M_1$, $M_2$) are formed, so that in each long line module, free interstices (FR) between the linear CCD detector arrays are shorter than the length of a light-sensitive segment of one linear CCD detector array;

two long line modules ($M_1$, $M_2$) each are disposed, one following the beam splitter (ST), below its transparent segments ($ST_1$, $ST_3$, ... ), and the other one laterally of this beam splitter (ST) next to its reflective segments ($ST_2$, $ST_4$, ... ), such that the centers of the linear CCD detector arrays ($CCD_2$, $CCD_4$, ... ) of the one long line module ($M_2$) coincide with the centers of the free interstices (FR) of the other long line module ($M_1$), and the lengths of the free interstices (FR) in each long line module ($M_1$, $M_2$) are selected to be so short that for the optoelectronic camera, a radiometrically largely loss-free signal is assured, on the one hand by means of substantially loss-free signals from the central segment of a linear CCD detector array behind the completely transparent, or respectively behind the completely reflective, segment of the beam splitter (ST), and on the other hand by means of electronic summation of signals from adjacent linear CCD detector arrays ($CCD_1$, $CCD_2$; $CCD_2$, $CCD_3$; $CCD_3$, $CCD_4$; ... ) in coinciding segments, corresponding to the transition zones ($ÜB_1$, $ÜB_2$, $ÜB_3$, $ÜB_4$, ... ), between the long line modules ($M_1$, $M_2$).

2. An optoelectronic CCD line scanner camera comprising:

a single lens;

an optical beam splitter having a length and being aligned to the lens such that a beam from the lens may be partially transmitted and partially reflected at an angle to the beam and perpendicularly to the length;

The beam splitter including segments sequentially disposed along the length, the segments including alternating transparent regions and reflective regions, the transparent regions and the reflective regions being separated by transition zones disposed therebetween, the transition zones each including a graded change from transparent to reflective;

a plurality of linear CCD detector arrays located generally at beam focus points and disposed in a staggered configuration, the staggered configuration including a first line parallel to the length and a second line parallel to the length such that the first line receives transmitted light from the beam splitter and the second line receives reflected light from the beam splitter;

adjacent ones of the linear CCD detector arrays in the staggered configuration having therebetween respective free interstices, the free interstices being shorter than a length of a light-sensitive region of any one linear CCD detector array;

adjacent ones of the linear CCD detector arrays overlapping along the length by an overlap distance greater than a transition zone distance; and means for electronic summation of signals from adjacent ends of the linear CCD detector arrays;

whereby signals from middle regions of the linear CCD detector arrays and signals from the transition zones may be continuously joined without loss of power.

* * * * *